US006904567B1

(12) United States Patent
Hermann et al.

(10) Patent No.: US 6,904,567 B1
(45) Date of Patent: Jun. 7, 2005

(54) PORTABLE ELECTRONIC DEVICE UPDATED VIA BROADCAST CHANNEL

(75) Inventors: Reto Hermann, Buttikon (CH); Dirk Husemann, Adliswil (CH); Michael Moser, Zurich (CH); Mike Nidd, Adliswil (CH); Andreas Schade, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 09/660,373

(22) Filed: Sep. 12, 2000

(30) Foreign Application Priority Data

Sep. 16, 1999 (EP) .......................................... 99118373

(51) Int. Cl.[7] .............................................. G06F 13/00

(52) U.S. Cl. ....................................... 715/756; 715/765

(58) Field of Search ................................ 715/756, 765, 715/727; 370/316; 345/700, 716, 723

(56) References Cited

U.S. PATENT DOCUMENTS

| | | | | |
|---|---|---|---|---|
| 5,835,487 A | * | 11/1998 | Campanella | 370/316 |
| 5,867,821 A | * | 2/1999 | Ballantyne et al. | 705/2 |
| 5,930,777 A | * | 7/1999 | Barber | 705/40 |
| 6,438,233 B1 | * | 8/2002 | Yoshimune et al. | 380/241 |

* cited by examiner

*Primary Examiner*—Cao (Kevin) Nguyen
(74) *Attorney, Agent, or Firm*—Thu Ann Dang; Anne V. Dougherty

(57) ABSTRACT

A system is provided for transmitting generally static media. The system (10) comprising an electronic device (12) and a digital audio transmitter (14). The electronic device (12) has a CPU (16), a storage medium (18), a display (20), a user interface (22), and a digital audio broadcast receiver (26). The digital audio transmitter (14) has a specialized broadcast server (30). The digital audio broadcast receiver (26) receives and decodes the digital audio signal transmitted by the digital audio transmitter (14).

36 Claims, 2 Drawing Sheets

PORTABLE ELECTRONIC DEVICE UPDATED VIA BROADCAST CHANNEL

FIELD OF THE INVENTION

This invention relates to a method and device for updating a system, and in particular, to a portable device that receives content via a broadcast channel.

BACKGROUND OF THE INVENTION

The prior art includes two different categories of systems. These include systems such as electronic books which receive substantially static content (e.g., books, music, movies, newspapers and magazines) from a specialized server via a serial link, line-of-sight link, or telephone line and systems (such as car radios) which receive small size information (e.g. travel information) via a broadcast channel. Such systems are described in U.S. Pat. Nos. 5,761,485 to Munyan and U.S. Pat. No. 5,339,091 to Yamazaki et al., the contents of which are incorporated herein by reference. The size of these messages, however, is limited due to bandwidth constraints.

In Europe, the normal radio signal provides additional digital traffic messages (TMC), which are received and stored in a car radio for later retrieval. The Philips™ car radio <<CARIN 520>>™, for example, has a voice synthesizer that reads relevant traffic information to the driver of a car. Such a TMC-enabled radio comprises a decoder which decodes the received TMC messages.

Current electronic books (<<e-books>>) such as the <<ROCKET EBOOK>>, the <<SOFTBOOK ELECTRONIC TABLET>>, OR THE <<EVERYBOOK ELECTRONIC BOOK>> constrain the user by requiring the use of either a modem and a phone line to connect directly or over the Internet to a special server or the use of a serial connection (cable-based or infrared) to a host PC running a special <<librarian>> program for downloading media to the e-book.

Therefore, what is needed is a system and method that updates a device with static media and which does not rely on direct or line-of-sight connection for updating purposes, but which can be updated by other means not requiring a constrained locational relationship between the receiving unit and the transmitting unit.

SUMMARY OF THE INVENTION

It is therefore an object of the invention to provide a system and a method of updating the contents of a portable electronic device which processes and displays large static media (e.g., electronic literature), by receiving Digital Audio Broadcast (<<DAB>>) signals of updating information. Use of a broadcast medium to transmit the updating information thus permits the distribution of electronic content to a large audience simultaneously.

In a feature of the invention, a smart card is used for metered access to content distributed via a broadcast medium.

BRIEF DESCRIPTION OF THE DRAWING

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings.

DETAILED DESCRIPTION OF THE INVENTION

There exist many examples of media of a non-interactive and generally static nature (e.g., electronic editions of newspapers, magazines, books, music and movies), in that they include pages which do not change due to a consumer input. Books, music and movies are examples of long-term static media, whereas newspapers and magazines are examples of short-term static media.

With non-interactive, static media that is of an appeal to a wide audience, the broadcast over a broadcast channel of this media, and the subsequent reception and decoding by a user, provides the user with generally appealing content while eliminating the need that the user establish constrained one-to-one connections. The more uses there are which have the hardware to receive such broadcasts, the more efficient such a means of distributing digital content becomes.

Figure 1:
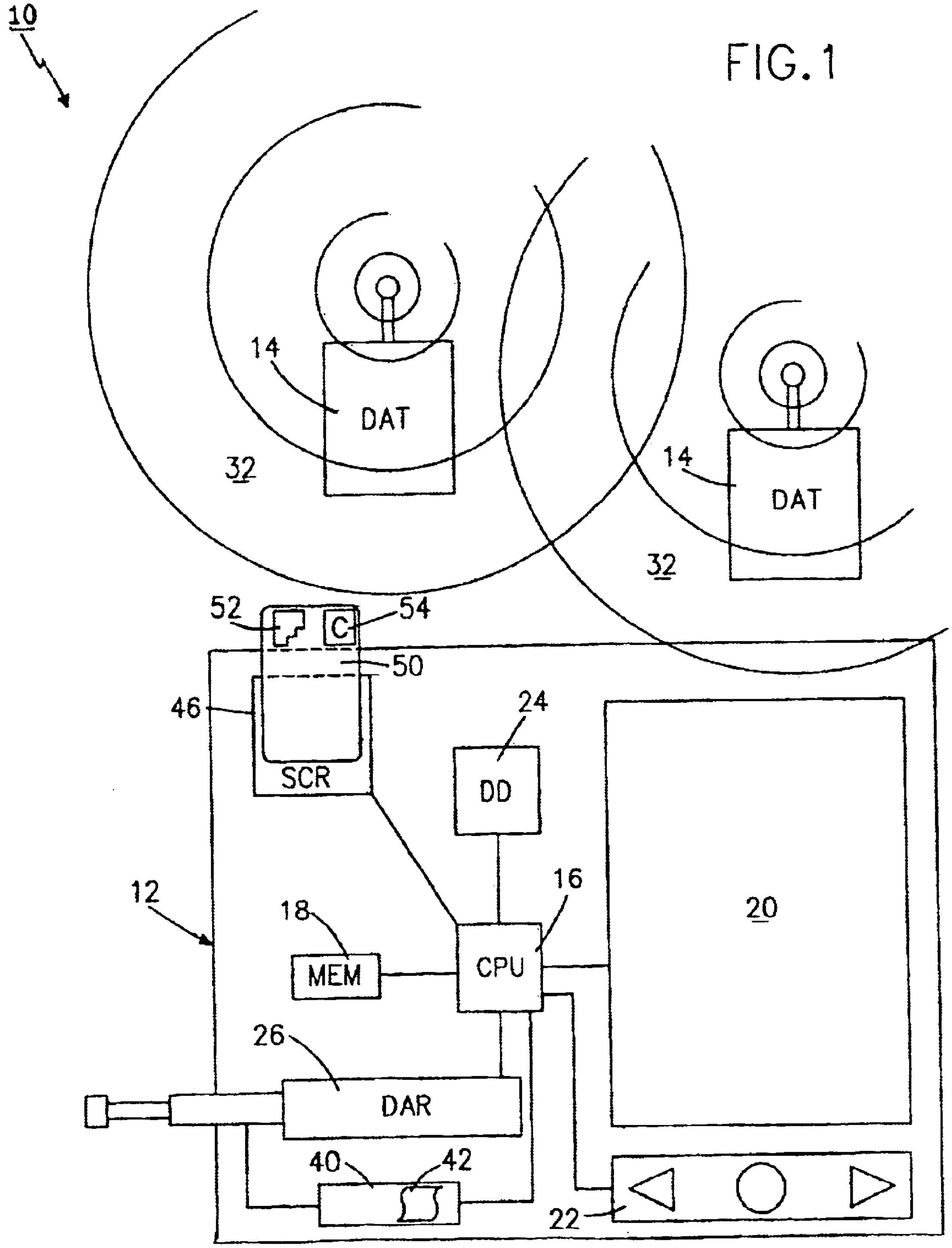
FIG. 1 is a schematic view partially in block diagram form of the invention.

Now referring to FIG. 1, the invention is a system 10 by which a user may receive generally static and non-interactive media using an electronic device such as an electronic book (<<e-book>>) 12. Such media includes digitized audio data, program-associated data such as program titles, program notes, CD cover images, and pure data broadcast using a Digital Audio Broadcast Transmitter (<<DAT>>) 14. The e-book 12 includes a CPU 16, a storage medium 18, a display 20, a user interface 22 (such as buttons or a touch screen for inputting navigation commands), a storage/retrieval device such as a floppy disc drive 24 by which programs and supplemental literature may be loaded to and unloaded from the device, and a Digital Audio Broadcast Receiver 26 (<<DAR>>) which receives and decodes the digital signal shown as 32.

The DATA 14 broadcasts content to device 12. The digital audio broadcast provides dynamically changing channel configurations : after identification of the nature of the media being transmitted, the likely available excess bandwidth is calculated and the channel dynamically adapted to such media. For example, when music is being transmitted, the full bandwidth of the channel is required. However, if merely the news is being broadcast, the allocated bandwidth can be substantially reduced, thus providing sufficient bandwidth for transient subchannels, which utilize the residual bandwidth.

The DAR 26 is a radio receiver which extracts and delivers a digital data stream from a broadcast channel. Optionally, the radio connection is used as the only communication channel for the e-book 12.

In an alternate embodiment, the broadcast includes content identifiers associated with the type-media broadcast. The e-book 12 includes a screening device 40 which, using appropriate software 42, blocks and permits the downloading of certain broadcasts according to a profile derived from a user questionnaire or by direct and selective control of the user. Information is <<pushed>> to the user. The user uses his user profile or specific reception or program requests to limit the media which can be <<pushed>> to his display.

Alternatively, the screening device 40 scans the broadcast channel periodically for specific content and, depending on the priority of the information indicated by the user, presents the information to the user via the display 20.

In a particular embodiment utilizing the screening device 40 of the invention, the e-book 12 is a portable data base of medical records used by physicians and nurses in a hospital or clinic environment. The broadcast medium updates medical records of a patient, while the physician is going about this normal business of visiting other patients. The updated records may then be selectively displayed to physicians.

In another embodiment of the invention, the e-book 12 includes a smart card reader 46 and processing software, in order to provide metered access to the broadcast media. Although some media may be transmitted free of charge to users (e.g., newspapers financed by advertising), other media may now be provided only on a subscription basis. Because the broadcast model is inherently a one-to-many relationship in which there is no feedback channel, the publisher of a magazine, for example, cannot directly control access to the distributed media and neither can he charge for it directly. Therefore, having a means of obtaining payment by conventional channels is essential, such as by post or by modem connection to the accounting service of the entity providing the broadcast. A smart card 50, having a cryptographic decryption key 52 encoded thereon, provides this means when, for example, one of the following representative payment methods is used.

In a first representative payment method, the broadcaster of, for example, a newspaper, may charge a set fee for unlimited access of the information, for an unlimited period. This would involve the broadcaster providing the user with a decryption key 52, for example, encoded on the smart card 50, or permitting the use of an existing key. The decryption key 52 is used to decrypt the encrypted content broadcast to the user. Although such a system is simple, hackers would likely take advantage of the simplicity and break the code after a short period of time. Therefore, the Broadcaster should be expected to change the encryption key periodically so as to minimize the likelihood of decoding through hacking. A subscriber simply purchases a smart card 50 encoded with the decryption key 52 for the current period. The broadcast is broadcast with the matching key, thus enabling those having the proper key 52 to decode the broadcast, without limitations. Once this period ends, the broadcaster changes the encryption code, thus preventing further access using the decryption key 52 encoded on the expired smart card 50 and necessitating the purchase by the user of a new card having the new matching key encoded thereon. However, this method has limitations, in that the cost of the service cannot be associated with the frequency of usage during the period of validity of the smart card 50.

In another representative payment method, the publisher likewise encrypts part or all of the media to be distributed with a cryptographic key. To subscribe to broadcast media, the user obtains a smart card 50 from the publisher (or uses a previously obtained smart card) which contains a decryption key 52 suitable for decrypting the broadcast media. Optionally, each cryptographic decryption key 52 on the smart card 50 is associated with a count registered in a counter 54. The e-book 12 then uses the smart card 50 to decrypt the encrypted broadcast content. In case a counter 54 is associated with the cryptographic decryption key 52 on the smart card 50, the smart card itself will decrement that counter each time a new issue (e.g. marked through appropriate header information) is decrypted. Optionally, the counter 54 is decremented for each decryption process. Once the counter 54 is null, the subscription becomes invalid and must be renewed by acquiring a counter-recharge or a new cryptographic decryption key 52. A smart card 50 with a null counter is no longer able to decrypt the broadcast content. Payment to the broadcaster could then be paid out of a pool, paid into an association including all or most broadcasters as members. A rating system could then determine the distribution of funds from this pool to each broadcaster. However, other means of payment are possible.

Optionally, debiting with the smart card 50 can be based upon a fee for each page downloaded (in which the counter 54 is decremented for each page downloaded). Further, a credit card may also be used and charged according to connect time in a manner known in the art, provided that an optional backchannel to charge the credit card is available.

Figure 2:
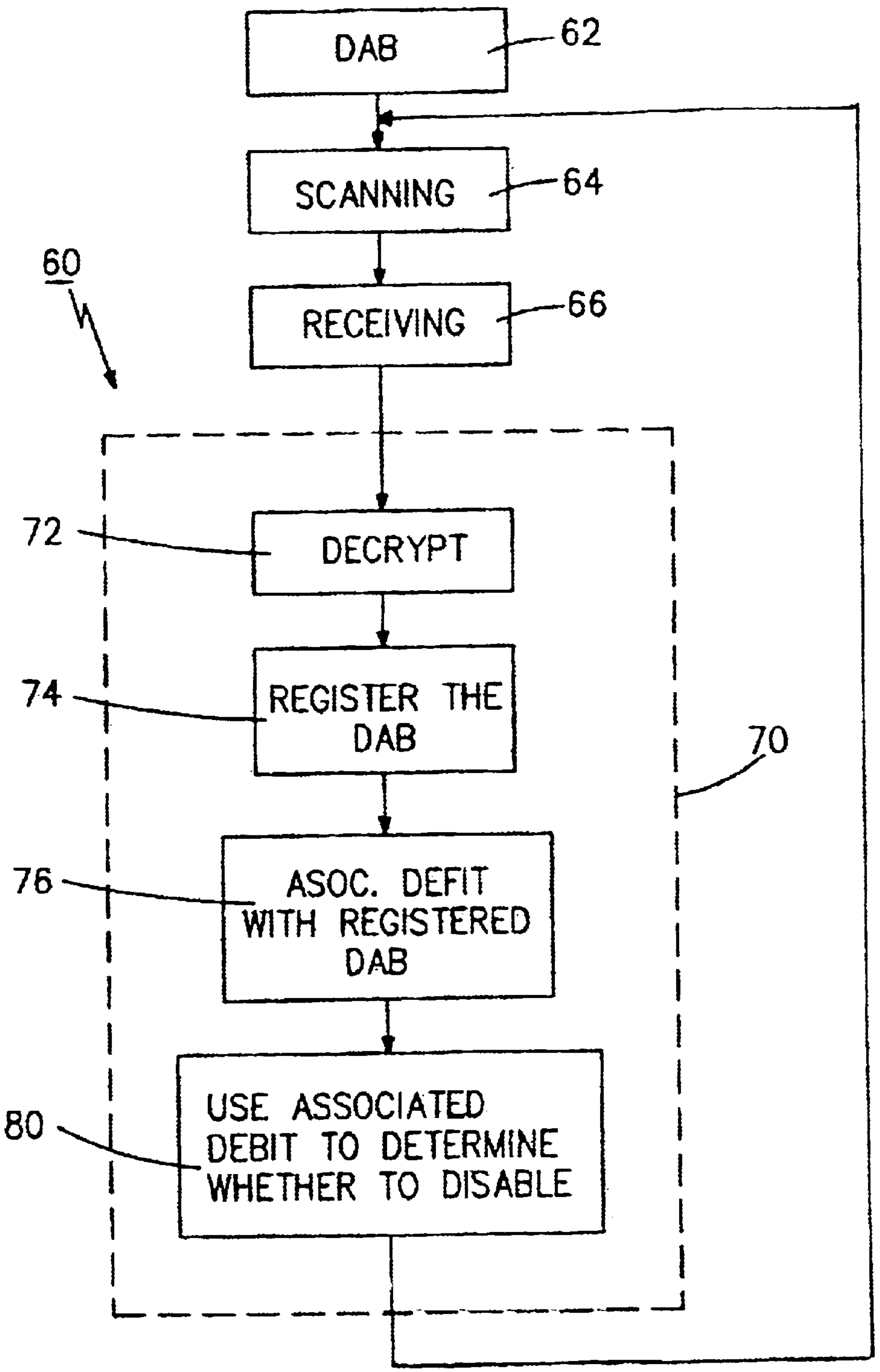
FIG. 2 is a flow chart illustrating the method of the invention.

Referring now to FIG. 2, using the system 10 of the invention, the method 60 of the invention includes the following steps. In a first step 62, the DAT 14 broadcasts the DAB including static media over a certain broadcast area. In a second optional step 64, using a scanning device (which is optionally always powered on so as to maximize the reception of the DAR), the DAR 26 scans the DAB for desired content which matches a user profile, a specific user request or subscription. In a third step 66, after any scanning device detects desired broadcast media and using the DAR 26 and profile-matching software 42, the e-book 12 receives the desired static media so broadcast. In an optional fourth step 70, where the DAB is encrypted, the system 10 uses cryptographic technology to limit access and obtain payment for the broadcast. Step 70 is made up of substeps 72, 74, 76 and 80. In the first substep 72, the device 12 decrypts at least a portion of the DAB using a decryption key 52 encoded on a smart card 50. In the second substep 74, concurrently with the reception, the device 12 registers the DAB received. In the third substep 76, the device 12 associated a debit, indicated for example by a decrementing counter on the smart card 50, with the registered DAB. In the fourth substep 80, the associated debit is used to decide whether to disable further decryption.

An advantage of the invention is that, instead of the constraints of a direct, cable- or line-of-sight-based connection, radio broadcast and reception is used, which is, by comparison, unconstrained, unobtrusive, easy to use, and thus more convenient.

Another advantage is that now, using the invention, a range of media such as newspapers, magazines, leaflets, traffic reports, weather reports, and books (e.g., bestsellers), may now be broadcast digitally, and thus are available to the user anywhere within the range of the digital broadcast.

Another advantage is that a smart card 50 is used to provide metered access to the content of a digital broadcaster, thus permitting the broadcaster to widely broadcast media while enabling the collection of funds from subscribers in order to recover the costs of the broadcast.

Another advantage is that no explicit update function is triggered by the user; this takes place in the background whenever data becomes available.

INDUSTRIAL APPLICABILITY

The invention is industrially applicable as it is used in a telecommunications system which provides digital content to a user wherever he might be, provided he is in range of the DAT 14.

A latitude of modification, change, and substitution is intended in the foregoing disclosure and in some instances, some features of the invention will be employed without a corresponding use of the other features. For example, the system of the invention may use PCs, PDAs, laptops, and other electronic devices besides e-books. Accordingly, it is appropriate that the appended claims be construed broadly and in a manner consistent with the spirit and scope of the invention as disclosed.

What is claimed is:

1. A portable electronic device for receiving broadcast media comprising digital signal information comprising:

a central processing unit (CPU) for processing digital signal information;

a storage medium for storing electronic data for selective on-demand viewing by authorized users;

a display;

a user interface; and a digital audio broadcast receiver which receives a digital signal transmitted by a digital audio transmitter and decodes the received digital signal for use by the CPU to update electronic data stored at said storage medium with said digital signal information.

2. The device of claim 1 wherein the device comprises an electronic book.

3. The device of claim 1 wherein the device comprises a portable database of medical records stored at said storage medium and wherein the digital broadcast transmitted by the digital audio transmitter updates said medical records of a patient.

4. The device of claim 3 further comprising a display processing means for selectively displaying updated records.

5. The device of claim 1 including a smart card reader and processing software, which permits a means of payment to the broadcaster of said digital signal from said digital audio transmitter.

6. The device of claim 1 wherein the digital audio broadcast receiver is a radio receiver which extracts and delivers a digital data stream from a broadcast channel.

7. The device of claim 1 wherein the device further includes a storage and retrieval device.

8. The device of claim 1 wherein the device further comprises a smart card reader and associated smart card data processing software for handling a smart card.

9. The device of claim 8 wherein the smart card has a cryptographic decryption key stored thereon for providing metered access to the broadcast media.

10. The device of claim 9 further comprising a counter and wherein the cryptographic decryption key on the smart card is associated with a count and wherein the counter decrements the count each time at least part of the digital signal is decrypted.

11. The device of claim 9 wherein the counter is decremented for each page downloaded.

12. A system for handling broadcast media comprising:

a transmitter comprising a broadcast server for transmitting a digital audio broadcast; and a portable electronic device comprising a central processing unit (CPU) for processing digital signal information, a storage medium for storing electronic data for selective on-demand viewing by authorized users; a display; a user interface; and a digital audio broadcast receiver which receives a digital signal transmitted by a digital audio transmitter and decodes the received digital signal for use by the CPU to update electronic data stored at said storage medium with said digital signal information.

13. The system of claim 12 wherein the digital audio transmitter broadcasts dynamically changing channel configurations in which channel bandwidth is dynamically adapted to the broadcast media being transmitted.

14. The system of claim 13 wherein the channel configuration is dynamically changed by identifying broadcast media which is not likely to require all available bandwidth, calculating excess available bandwidth, and allocating the excess in a manner which provides sufficient bandwidth for transient subchannels.

15. The system according to claim 12 wherein the digital audio broadcast includes content identifiers associated with the type of media broadcast; wherein the device includes a screening device which selectively permits the downloading of broadcasts according to said content identifiers.

16. The system of claim 12, wherein the device further comprises means to periodically scan a broadcast channel for specific content.

17. The system of claim 12 wherein the electronic device further comprises a smart card reader and associated smart card data processing software for handling a smart card.

18. The system of claim 17 wherein the smart card has a cryptographic decryption key stored thereon for providing metered access to the broadcast media.

19. The system of claim 18 further comprising a counter and wherein the cryptographic decryption key on the smart card is associated with a count and wherein the counter decrements the count each time at least part of the digital signal is decrypted.

20. The system of claim 17 wherein the smart card reader and associated smart card data processing software enable payment to the broadcaster whereby the broadcaster broadcasts an encrypted signal and charges a set fee for a smart card having a decryption key encoded thereon and for which the smart card reader and associated smart card data processing software are capable of decrypting the signal only during a certain period of time.

21. The system of claim 20 wherein, when inserted in a smart card reader of the device, the smart card enables unlimited access to the broadcast signal only during the certain period of time.

22. The system of claim 21 wherein the broadcast media is transmitted with the matching key, thus enabling only those having the proper decryption key to decode the broadcast media.

23. A method of providing broadcast media for updating stored electronic data in a storage location at a portable electronic device, the method comprising the steps of:

broadcasting a digital audio signal over a broadcast range;

receiving the signal at a digital audio receiver;

decoding the digital audio signal to obtain update data; and updating the contents of the storage location at the portable electronic device using the update data.

24. The method of claim 23 further comprising a smart card to meter access to the broadcast media.

25. The method of claim 23 wherein the broadcast media comprises media of a non-interactive nature selected from the group consisting of electronic editions of newspapers, magazines, books, movies, digitized audio data, program-associated data, program titles, program notes, CD cover images, and pure data.

26. The method of claim 23 further comprising scanning the digital audio signal for media content.

27. The method of claim 26 wherein said scanning for desired media content comprises attempting to match at least one of a user profile, a specific user request or a subscription.

28. The method of claim 23 further comprising encrypting said signal prior to broadcasting.

29. The method of claim 28 further comprising decrypting at least a portion of the broadcast.

30. The method of claim 29 wherein the decrypting comprising using a decryption key encoded on a smart card.

31. The method of claim 23 further comprising registering the broadcast received.

32. The method of claim 23 further comprising associating a debit with the broadcast received for billing purposes.

33. The method of claim 23 wherein the digital audio broadcast includes content identifiers associated with the type of media broadcast and further comprising the step of screening to selectively permit the downloading of broadcasts according to said content identifiers.

34. The method of claim 23 further comprising said digital audio transmitter broadcasting dynamically changing channel configurations in which channel bandwidth is dynamically adapted to the broadcast media being transmitted.

35. The method of claim 34 wherein the channel configuration is dynamically changed by identifying broadcast media which is not likely to require all available bandwidth, calculating excess available bandwidth, and allocating the excess in a manner which provides sufficient bandwidth for transient subchannels.

36. A program storage device readable by machine, tangibly embodying a program of instructions executable by the machine to perform method steps for updating the contents of a storage location at a portable electronic device, the method comprising the steps of:

receiving a digital audio signal at a digital audio receiver;

decoding the digital audio signal to obtain update data; and updating the contents of the storage location at the portable electronic device using said update data.

* * * * *